United States Patent [19]

Bednar et al.

[11] Patent Number: 4,853,174

[45] Date of Patent: Aug. 1, 1989

[54] LOW LEVEL DETECTOR MONITOR

[75] Inventors: Fred H. Bednar, Pittsburgh; Kenneth G. Lunz, Blannox, both of Pa.

[73] Assignee: Westinghouse Electric Corp., Pittsburgh, Pa.

[21] Appl. No.: 105,186

[22] Filed: Oct. 6, 1987

Related U.S. Application Data

[63] Continuation-in-part of Ser. No. 875,912, Jun. 19, 1986, abandoned.

[51] Int. Cl.$^4$ .................... G21C 17/00; G01T 3/00
[52] U.S. Cl. .................... 376/254; 376/154; 376/259; 250/390.01; 250/392
[58] Field of Search .......... 376/154, 254, 255, 259; 250/392, 390.01

[56] References Cited

U.S. PATENT DOCUMENTS

| | | | |
|---|---|---|---|
| 2,852,694 | 9/1958 | McGreary, Jr. | 250/392 |
| 3,879,612 | 4/1975 | Foster et al. | 250/390.01 |
| 3,898,466 | 8/1975 | Kawashima | 250/392 |
| 4,071,764 | 1/1978 | Thurlow, II | 250/390.01 |
| 4,086,490 | 4/1978 | Todt, Sr. | 250/390.01 |
| 4,493,811 | 1/1985 | Seki et al. | 376/254 |
| 4,495,144 | 1/1985 | Lingren et al. | 376/255 |
| 4,623,508 | 11/1986 | Glesius et al. | 376/254 |

Primary Examiner—Harvey E. Behrend

[57] ABSTRACT

A method and apparatus for monitoring the neutron flux in the core of a nuclear reactor by means of a neutron detector which is composed of two electrodes between which a d.c. bias voltage is applied and which has a greater neutron sensitivity when the d.c. bias voltage is applied with one polarity than with the opposite polarity, which involves operating the nuclear reactor at a power level in the vicinity of zero, and applying a d.c. bias level with the one polarity between the detector electrodes and measuring the neutron-induced current flowing through the detector electrodes.

To permit reversal of the bias voltage polarity, a safety interlock is provided to permit this to occur only if the bias voltage has been brought below a selected level.

7 Claims, 3 Drawing Sheets

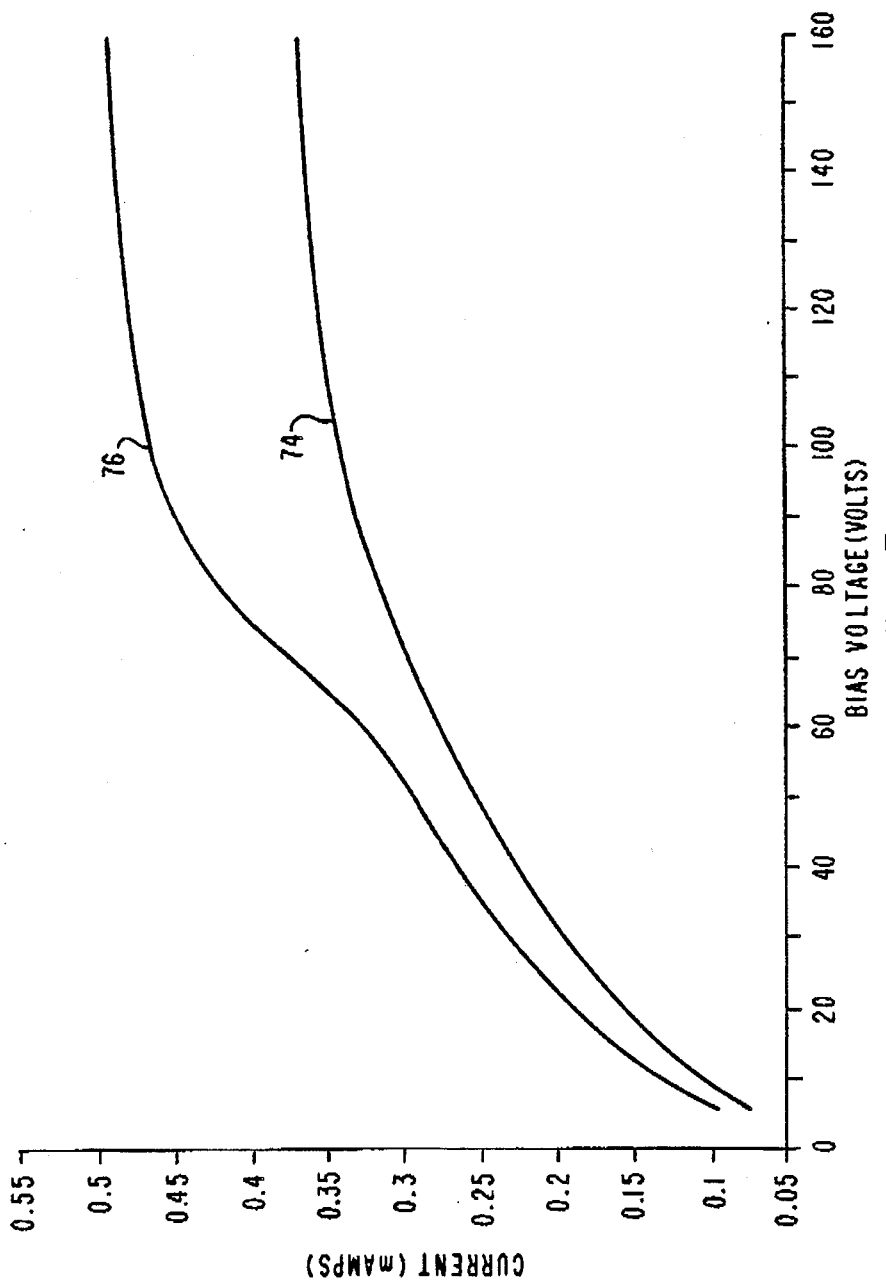

LOW LEVEL DETECTOR MONITOR

CROSS-REFERENCE TO RELATED APPLICATION

The present application is a continuation-in-part of copending application Ser. No. 875,912 filed June 19, 1986, now abandoned.

BACKGROUND OF THE INVENTION

The present invention relates to a method and apparatus for monitoring, or mapping, the neutron flux in nuclear reactors.

The monitoring of a nuclear reactor, such as, for example, a pressurized water reactor, includes the production of flux maps when the reactor is operating in the low output power range during initial plant start-up and following each refueling operation. In order to create sufficient neutron activity to obtain a flux map with known mapping assistance, it is necessary to increase the reactor output power to 4-5 percent of rated power. Such power increase for the purpose of enabling a flux map to be produced increases the possibility of an inadvertent reactor trip and causes steaming, which wastes condensate water. It would therefore be desirable to be able to obtain accurate flux maps with the reactor operating at zero power output.

SUMMARY OF THE INVENTION

It is an object of the present invention to make possible the production of accurate flux maps in a nuclear reactor, and particularly a pressurized water reactor, even when the reactor is operating essentially at a zero power output.

Another object of the invention is to achieve the above-stated result with the use of known neutron detectors.

Another object of the invention is to improve the sensitivity and signal/noise ratio of known detectors in a flux mapping system.

A further object of the invention is to permit the sensitivity of the detector employed in such a system between two levels without subjecting the detector to damage during a sensitivity level switching operation.

Yet another object of the invention is to simplify monitoring of the flux mapping procedure.

The above and other objects of the invention are achieved, essentially, in a method for monitoring the neutron flux in the core of a nuclear reactor by means of a neutron detector which is composed of two electrodes between which a d.c. bias voltage is applied and which has a greater neutron sensitivity when the d.c. bias voltage is applied with one polarity than with the opposite polarity, by the steps of:

operating the nuclear reactor at a power level in the vicinity of zero; and applying a d.c. bias level with the one polarity between the detector electrodes and measuring the neutron-induced current flowing through the detector electrodes.

The objects of the invention are further achieved by a system for monitoring the flux in a nuclear reactor, the system comprising:

at least one neutron detector composed of two electrodes between which a current representative of neutron density flows when a d.c. bias voltage is applied between the electrodes, the detector being constructed to have a neutron sensitivity which is higher for one d.c. bias voltage polarity than for the opposite d.c. bias voltage polarity;

a d.c. voltage source;

connecting means for applying a d.c. voltage from the source between the electrodes, as a d.c. bias voltage, the connecting means being switchable for applying the d.c. voltage between the electrodes with either polarity;

voltage control means connected to the source for varying the amplitude of the d.c. bias voltage; and safety interlock means coupled to the connecting means and to monitor the amplitude of the d.c. bias voltage for permitting the connecting means to be switched only when the d.c. bias voltage amplitude is below a selected value.

According to a novel feature of preferred embodiments of the invention, the detector is connected to the bias voltage source, the control voltage source and the measuring devices via a circuit which is isolated from any circuit ground. As a result, the effective sensitivity and the signal/noise ratio of the detector are improved.

According to a further feature of preferred embodiments of the invention, the polarity of the bias voltage applied to the detector can be selectively reversed to thereby adapt the detector to operation at different power levels. A bias voltage of conventional polarity is applied if the reactor is operating at a level somewhat above zero power output, and the polarity of the bias voltage is reversed if measurements are to be made with the reactor operating at a near zero power output. A safety interlock is provided to permit a polarity reversal to be effected only if the bias voltage amplitude is at a low level.

Furthermore, in preferred embodiments of the invention, control of the bias voltage is effected by varying the amplitude of a low level control voltage having, for example, a maximum value of 12 volts.

In further accordance with the invention, detector current and voltage are displayed on respective liquid crystal displays, with the display associated with the current reading being provided with a dual color (red/green) LED. When the signal supplied to the associated indicator has a value above a selected normal range, the red indicator is activated. On the basis of such an indication, the operator can actuate a range switch to reduce the voltage until the current reading drops back into to the normal range.

BRIEF DESCRIPTION OF THE DRAWING,

FIG. 3 is a diagram illustrating the operating characteristics of a detector which can be employed in the practice of the present invention.

DESCRIPTION OF THE PREFERRED EMBODIMENTS

Figure 1:
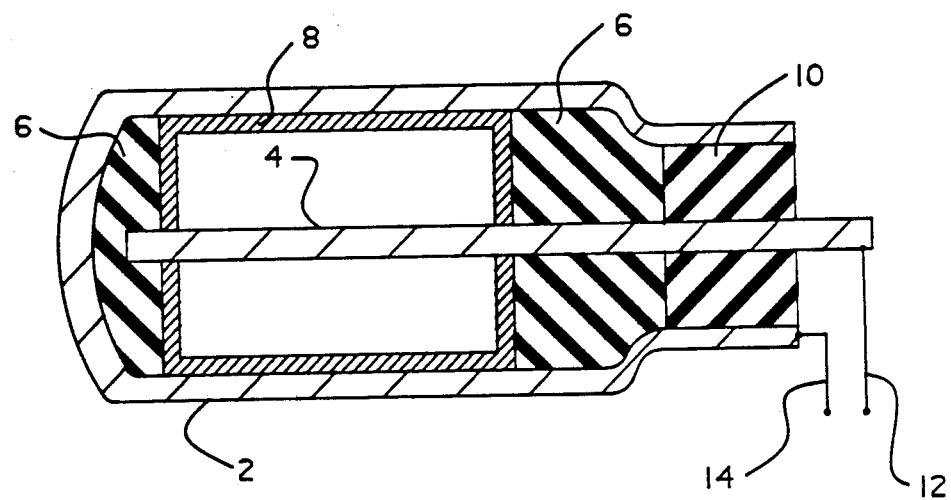
FIG. 1 is a cross-sectional view of an embodiment of a detector which can be employed in the practice of the present invention.

FIG. 1 shows a neutron detector device suitable for practice of the present invention. This device includes a stainless steel case and outer electrode 2 and a stainless inner electrode 4 supported within, and insulated from, case 2 by means of high purity $Al_2O_3$ ceramic insulators 6. Case 4 and insulator 6 enclose, and delimit an ionization chamber which is filled with argon gas and lined with a coating layer 8 of $U_3O_8$, a uranium oxide with 90% enriched U-235. At the side where electrode 4 emerges from case 2, the space therebetween is filled with a mineral mass 10 so that the open end of case 2 and the associated part of electrode 4 constitute a mineral filled output coax.

Inner conductor 4 and case 2 are connected to conductive leads 12 and 14, respectively.

To effect neutron detection, a d.c. bias voltage of the order of 20 to 150 V is applied between leads 12 and 14 and the current flowing between electrode 4 and case 2 is monitored. Thermal neutrons penetrating case 2 trigger in layer 8, fission events, resulting in the production of high energy ionizing fission fragments which enter the argon-filled chamber where they ionize the argon gas. This creates positive-negative ion pairs and the ions of each polarity accelerate to a corresponding one of electrode 4 and case 2, producing the above-mentioned current flow therebetween. This current flow is directly proportional to the thermal neutron density in the region of the detector.

Heretofore, it has been the practice to apply the bias voltage with a polarity such that electrode 4 is biased positive relative to case 2 and it is known that existing detectors having the form described above and shown in FIG. 1 will exhibit a thermal neutron sensitivity of at least $1.0 \times 10^{-17}$ Amp/NV, where N is neutron density (neutrons/$cm^3$) and V is average neutron velocity (cm/sec).

It has been discovered, however, that the detector sensitivity can be increased significantly by simply reversing the polarity of the bias voltage applied between electrode 4 and case 2, i.e., by making the bias potential on case 2 positive relative to that on electrode 4. To the best of Applicant's knowledge, this will be true for any practical embodiment having the above-described form.

It appears that such bias voltage polarity reversal will enhance the space-charge collection within the detector since a positively charged coating layer 8 has a greater charge collection capability than does a positively charged inner electrode 4. Tests have shown that this bias voltage polarity reversal can produce a signal output increase of the order of 55%.

The present invention utilizes this effect to make possible a sufficiently accurate flux mapping in a nuclear reactor operating at a zero or very low power level.

The polarity reversal will have no effect on detector sensitivity depletion or detector burn-up. The detector sensitivity is dependent on the depletion of the Uranium 235 in the active coating 8 and the loss of Argon fill gas. Polarity reversal does not change the neutron flux incident on the detector so there will be no additional U-235 depletion. Polarity reversal will not affect the fill gas.

The polarity reversal may have some effect on the detector response linearity at higher power levels. However, the reversed polarity mode will only be used at low power levels in the practice of this invention.

Figure 2:
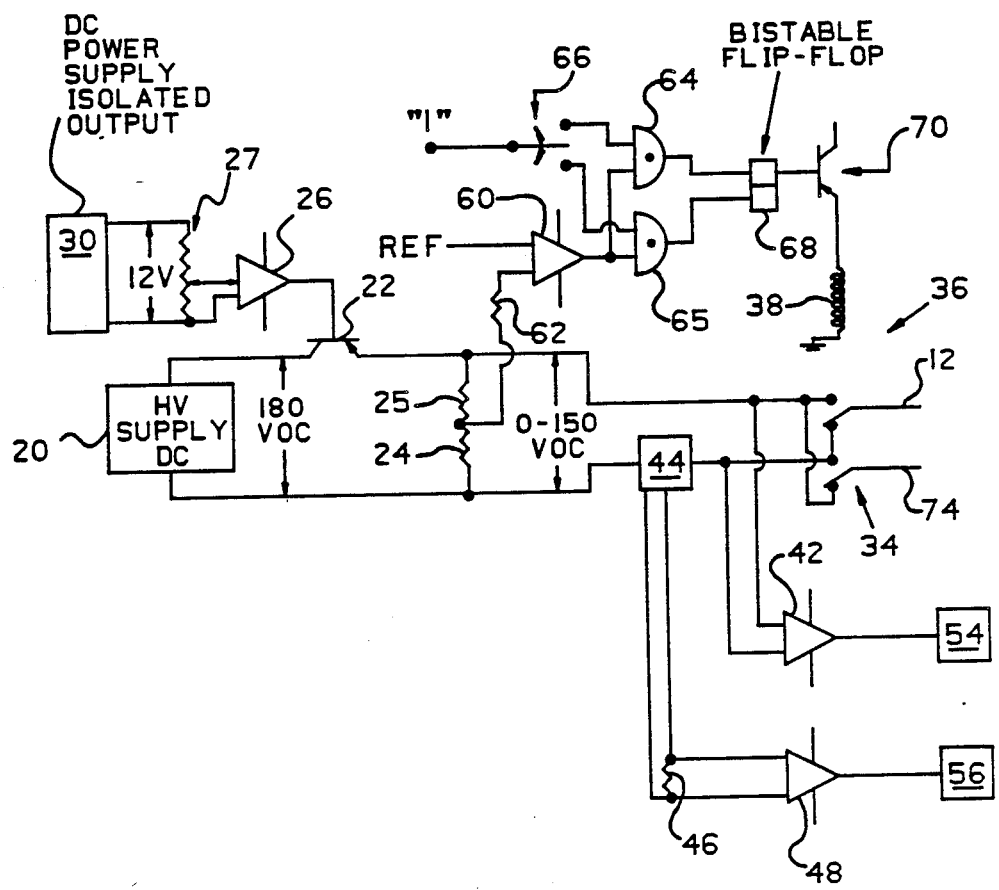
FIG. 2 is a block circuit diagram of a preferred embodiment of a system according to the invention for supplying a bias voltage to and obtaining voltage and current readings from the detector of FIG. 1.

FIG. 2 shows a circuit for controlling the bias voltage applied to the detector of FIG. 1 and for monitoring the amplitude of that bias voltage and of the detector current. The bias voltage is provided by a high voltage d.c. supply 20 having an output which is isolated from ground and which has an amplitude of the order of 180 V. The collector-emitter path of a transistor 22 is connected to one output terminal of supply 20. The collector-emitter path of transistor 22 forms a variable series resistor of a high voltage control circuit. Resistors 24 and 25 are connected in series between the emitter of transistor 22 and the other output terminal of supply 20 so that the collector-emitter path of transistor 22 and resistors 24 and 25 form a voltage divider connected across the output of supply 20.

The collector-emitter resistance of transistor 22 is varied by application, to the base of transistor 22, of a control voltage supplied by a differential amplifier 26. The inputs of differential amplifier 26 are connected between one end terminal and the movable top of a potentiometer 28. The end terminals of potentiometer 28 are connected across the output of a 12 V d.c. power supply 30 whose output is floating, or isolated from ground.

Amplifier 26 is given a gain such that a variation of its input voltage between 0 and 12 V will produce an output voltage variation that will, in turn, vary the collector-emitter resistance of transistor 22 over a range which causes the voltage across resistor 24 to vary between, for example, 0 and 150 V.

The d.c. voltage thus appearing across resistors 24 and 25 is applied between leads 12 and 14 via the movable contacts 34 of a polarity reversing relay 36 which also includes an actuating coil 38 whose energization state determines the polarity of the bias voltage between leads 12 and 14.

For monitoring purposes, the voltage applied between leads 12 and 14 is also applied between the inputs of an isolation amplifier 42 and a voltage proportional to the current through leads 12 and 14 is derived by means of a current transformer 44, e.g. a sampling resistor connected in series in one bias voltage conductor, and an output resistor 46 and is applied between the inputs of an isolation amplifier 48. The output signals from amplifiers 42 and 48 are applied directly to respective display devices 54 and 56, which may be liquid crystal display devices.

While flux mapping according to the invention involves application of a bias voltage of a single polarity while the reactor power output is at or near zero, there will be occasions when flux is to be monitored while a bias voltage of the opposite polarity is being applied to the detector. It is for this purpose that relay 36 is provided.

However, when the detector bias voltage polarity is switched, it is important that the bias voltage have a low amplitude because polarity switching when the bias voltage is at a high amplitude will cause high transients due to the capacitive reactance of external circuit components, such as leads 12 and 14 and the detector itself and would be likely to damage the detector.

For these reasons, a change in the switching state of relay 36 is controlled by a safety interlock circuit that includes a differential amplifier 60 having a first input connected to receive a selected reference potential and a second input connected to the connection point between resistors 24 and 25 via a resistor 62 to receive a potential representative of the voltage between leads 12 and 14. Differential amplifier 60 is set to produce an output voltage having a selected polarity and minimum amplitude only if the voltage between leads 12 and 14 is below a given amplitude selected to prevent detector damage upon polarity switching. A preferred selected amplitude is 2 volts, although a somewhat higher value could be employed.

The output of amplifier 60 is applied to one input of each of two AND gates 64 and 65 which evaluate the output voltage of amplifier 60 as a logical "1" only if that output voltage ha the above-mentioned selected polarity and amplitude equal to or exceeding the above-mentioned minimum amplitude.

A second input of each AND gate 64 and 65 is connected to a respective output contact of a two-position switch 66. The input terminal of switch 66 is connected to a potential which would be evaluated by gates 64 and 65 as a logical "1".

The output of gate 64 is connected to one input of a bistable flip-flop 68 and the output of gate 65 is connected to the other input of flip-flop 68. Flip-flop 68 has an output connected to the base of a switching transistor 70 the collector-emitter path of which is connected in series between a source of actuating potential for relay 36 and relay coil 38. When the output signal from flip-flop 68 is in a first logic state, transistor 70 will be conductive, when that output signal is in a second logic state, transistor 70 will be blocking.

The output state of flip-flop 68 will be inverted only if the switching state of switch 66 is reversed and the voltage across resistor 24, which is proportional to the voltage between leads 12 and 14, is below the above mentioned given amplitude.

In a practical embodiment of a system according to the invention, the voltage controlled attenuator, constituted essentially by transistor 22, can be selected to withstand up to 300 V d.c. By controlling the operation of transistor 22 by means of the low level, isolated d.c. voltage across resistor 28, the possibility of shock is avoided and power losses are reduced.

The leads 12 and 14 which supply a bias voltage to, and conduct the current of, the detector are both isolated from any circuit ground, and the entire circuit connected to leads 12 and 14 is equally isolated from circuit ground due to the fact that the output of voltage supply 20 is floating and amplifiers 42 and 48 have high impedance inputs. This isolation is completed by the fact that amplifier 60 has a high impedance input and the control voltage for transistor 22 is derived from the isolated output of supply 30. This isolation of the connections to the detector from circuit ground facilitate the application of a bias voltage of either polarity to the detector and, moreover, improve detector sensitivity and signal/noise ratio. These advantages are achieved even if the source of operating power (not shown) to the various differential amplifiers is not itself isolated.

FIG. 3 illustrates a typical set of characteristic curves for the detector of FIG. 1. These curves depict detector output current as a function of bias voltage in the presence of a constant neutron flux level. Curve 74 represents the detector characteristic associated with the customary bias voltage polarity, i.e. with electrode 4 positive with respect to case 2. Curve 76 is associated with the opposite bias voltage polarity. For each characteristic, as the magnitude of the bias voltage is increased from 0, the response sensitivity first increases relatively steeply and then attains a plateau, beginning at about 100 volts, after which the sensitivity increases relatively slowly. At still higher bias voltage magnitudes, beyond the range of FIG. 3, the sensitivity will again begin to rise more steeply. Preferably, the bias voltage of either polarity is set in the region of the associated plateau so that unintended fluctuations in the bias voltage magnitude will not significantly alter the sensitivity value. In the exemplary case shown in FIG. 3, the bias voltage magnitude would be set in the region of 120 to 140 volts.

We claim:

1. A system for monitoring the flux in a nuclear reactor, said system comprising:
   at least one neutron detector composed of two electrodes between which a current representative of neutron density flows when a d.c. bias voltage is applied between said electrodes, said detector being constructed to have a neutron sensitivity which is higher for one d.c. bias voltage polarity than for the opposite d.c. bias voltage polarity;
   a d.c. voltage source;
   connecting means for applying a c. voltage from said source between said electrodes, as a d.c. bias voltage, said connecting means being switchable for applying the d.c. voltage between said electrodes with either polarity;
   voltage control means connected to said source for varying the amplitude of the d.c. bias voltage; and
   safety interlock means coupled to said connecting means and connected to monitor the amplitude of the d.c. bias voltage for permitting said connecting means to be switched only when the d.c. bias voltage amplitude is below a selected value.

2. A system as defined in claim 1 further comprising bias voltage and detector current sensing means connected in circuit between said source and said electrodes.

3. A system as defined in claim 2 wherein said detector electrodes, said connecting means, the output of said voltage source and said sensing are all electrically isolated from any circuit ground.

4. A system as defined in claim 3 wherein said voltage control means comprise means providing a variable d.c. control voltage having a maximum amplitude substantially lower than the maximum amplitude of the d.c. bias voltage and voltage varying means connected between said variable d.c. control voltage providing means and said source for varying the amplitude of the d.c. bias voltage in dependence on the value of the variable d.c. control voltage.

5. A system as defined in claim 2 further comprising display means coupled to said sensing means for producing displays of the amplitudes of the d.c. bias voltage and the current flowing between said electrodes.

6. A system as defined in claim 5 wherein said sensing means comprise isolation amplifiers having high input impedances.

7. A system as defined in claim 5 wherein said display means comprise liquid crystal displays.

* * * * *